(12) United States Patent
Oka (10) Patent No.: US 11,108,307 B2
(45) Date of Patent: Aug. 31, 2021

(54) COIL FOR ROTARY ELECTRIC MACHINE AND INSERTION METHOD

(71) Applicant: HONDA MOTOR CO., LTD., Tokyo (JP)

(72) Inventor: Keiichiro Oka, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 485 days.

(21) Appl. No.: 16/141,282

(22) Filed: Sep. 25, 2018

(65) Prior Publication Data

US 2019/0103790 A1 Apr. 4, 2019

(30) Foreign Application Priority Data

Sep. 29, 2017 (JP) .............................. JP2017-189805
Mar. 28, 2018 (JP) .............................. JP2018-061243

(51) Int. Cl.
| | | |
|---|---|---|
| *H02K 3/04* | (2006.01) | |
| *H02K 3/14* | (2006.01) | |
| *H02K 15/02* | (2006.01) | |
| *H02K 1/14* | (2006.01) | |
| *H02K 15/06* | (2006.01) | |
| *H02K 1/16* | (2006.01) | |
| *H02K 15/085* | (2006.01) | |
| *H02K 3/28* | (2006.01) | |

(Continued)

(52) U.S. Cl.
CPC .......... *H02K 15/024* (2013.01); *H02K 1/146* (2013.01); *H02K 1/16* (2013.01); *H02K 3/12* (2013.01); *H02K 3/28* (2013.01); *H02K 15/045* (2013.01); *H02K 15/066* (2013.01); *H02K 15/085* (2013.01); *H02K 2203/09* (2013.01)

(58) Field of Classification Search
CPC .. H02K 3/04; H02K 3/12; H02K 3/14; H02K 3/28; H02K 15/085; H02K 15/06; H02K 15/024; H02K 15/065; H02K 15/045; H02K 15/066; H02K 1/146; H02K 1/16; H02K 2203/09
See application file for complete search history.

(56) References Cited

U.S. PATENT DOCUMENTS

| | | | | |
|---|---|---|---|---|
| 4,964,291 A | * | 10/1990 | Otty ..................... | H02K 15/045 72/298 |
| 5,211,670 A | * | 5/1993 | Ohmi ...................... | H02K 3/12 29/598 |

(Continued)

FOREIGN PATENT DOCUMENTS

| | | |
|---|---|---|
| CN | 102160266 | 8/2011 |
| CN | 106233576 | 12/2016 |
| WO | 2015/186838 | 12/2015 |

OTHER PUBLICATIONS

Chinese Office Action dated Apr. 8, 2020, 7 pages.

*Primary Examiner* — Edgardo San Martin
(74) *Attorney, Agent, or Firm* — Rankin, Hill & Clark LLP (57) ABSTRACT

A coil (1) for a rotary electric machine is annularly formed by twelve coil members (10), each coil member (10) is configured of four coil elements (10A) to (10D), the coil elements (10A) to (10D) integrally include a plurality of sets of coil element structures each set of coil element structures including a pair of base portions (11), and four arm portions (12) and two curl portions (13), and the plurality of sets of coil element structures are annularly configured.

4 Claims, 10 Drawing Sheets

(51) Int. Cl.
*H02K 15/04* (2006.01)
*H02K 3/12* (2006.01)

(56) References Cited

U.S. PATENT DOCUMENTS

| | | | | |
|---|---|---|---|---|
| 6,181,044 B1 * | 1/2001 | Umeda | ............ | H02K 3/12 |
| | | | | 29/596 |
| 6,376,961 B2 * | 4/2002 | Murakami | ........ | H02K 3/14 |
| | | | | 310/179 |
| 6,690,099 B2 * | 2/2004 | Asao | ............ | H02K 1/165 |
| | | | | 310/216.069 |
| 6,806,611 B2 * | 10/2004 | Bharaj | ......... | H02K 3/12 |
| | | | | 310/179 |
| 6,825,589 B2 * | 11/2004 | Kouda | .......... | H02K 3/28 |
| | | | | 310/201 |
| 6,946,759 B2 * | 9/2005 | Asao | ............ | H02K 3/50 |
| | | | | 310/45 |
| 7,825,562 B2 * | 11/2010 | Naganawa | ...... | H02K 15/045 |
| | | | | 310/208 |
| 7,876,016 B2 * | 1/2011 | Saari | ............ | H02K 15/085 |
| | | | | 310/213 |
| 9,077,216 B2 * | 7/2015 | Koga | ............ | H02K 15/066 |
| 9,425,666 B2 * | 8/2016 | Ishigami | ......... | B60L 50/61 |
| 10,044,236 B2 * | 8/2018 | Tamura | .......... | H02K 3/30 |
| 10,236,735 B2 * | 3/2019 | Kudose | ......... | H02K 1/2706 |
| 10,651,699 B2 * | 5/2020 | Scherer | ......... | H02K 15/022 |
| 10,910,900 B2 * | 2/2021 | Oka | ............ | H02K 3/12 |
| 10,951,079 B2 * | 3/2021 | Oka | ............ | H02K 15/0478 |
| 2005/0258703 A1 * | 11/2005 | Kouda | .......... | H02K 3/12 |
| | | | | 310/180 |
| 2012/0139383 A1 * | 6/2012 | Wolf | ............ | H02K 3/28 |
| | | | | 310/208 |
| 2014/0015367 A1 * | 1/2014 | Umehara | ........ | H02K 3/38 |
| | | | | 310/208 |
| 2016/0254718 A1 * | 9/2016 | Watanabe | ....... | H02K 3/12 |
| | | | | 310/208 |
| 2018/0034332 A1 * | 2/2018 | Takahashi | ....... | H02K 21/14 |
| 2019/0386551 A1 * | 12/2019 | Sasaki | .......... | H02K 21/24 |

* cited by examiner

COIL FOR ROTARY ELECTRIC MACHINE AND INSERTION METHOD

BACKGROUND OF THE INVENTION

Field of the Invention

The present invention relates to a coil for a rotary electric machine and a method for inserting the same.

Description of the Related Art

Conventionally, a coil disclosed in International Publication No. WO 2015/186838 is known as a coil for a rotary electric machine. This coil is formed and assembled by edge-wise bending processing, and in a single coil member, a rectangular conducting wire is wound by a plurality of turns.

In this coil, many coil members and many insulating members are combined to assemble a coil assembly, which is reduced in diameter so that an outer diameter before stator mounting is smaller than an inner diameter of the stator. When mounted on the stator, the coil assembly is pressed toward an outside in a radial direction from an inside thereof by a guide jig to be expanded in diameter. As a result, the rectangular conducting wires of the coil are housed in slots in a posture in which they are in contact with each other and in a state in which they are stacked in a large number in the radial direction.

According to the conventional coil for a rotary electric machine, when the coil assembly is mounted on the stator, it is necessary to expand the diameter after reducing the diameter of the coil assembly, so that pressing force in the radial direction repeatedly acts on a reduced diameter side and an expanded diameter side with respect to each coil member. In that case, since the rectangular conducting wires of the coil need to elastically/plastically deform an arm portion in an edge-wise direction, and many of them are stacked in a large number in a posture in which they are contacting each other in the radial direction, the pressing force increases. Along with this, burden on the coil also increases, and there is a possibility that manufacturing cost may be increased by increasing size and cost of a processing apparatus such as the guide jig.

It is therefore an object of the present invention to provide a coil for a rotary electric machine and a method for inserting the coil, which can reduce the pressing force when the coil is mounted on a stator and can reduce the burden on the coil and the manufacturing cost.

SUMMARY OF THE INVENTION

In order to solve the above problem, a coil for a rotary electric machine of the first invention is annularly formed by a plurality of coil members 10, in a coil 1 for the rotary electric machine to be inserted into a slot 2a of an annular stator 2 of the rotary electric machine, each of the plurality of coil members 10 is configured of a plurality of coil elements 10A to 10D, the plurality of coil elements 10A to 10D integrally include a plurality of sets of coil element structures, each set of coil element structures including a first base portion 11 and a second base portion 11 which are inserted into the slot 2a, extend in an axial direction of the coil 1 and spaced in a circumferential direction of the coil 1, a first connecting portion (arm portion 12, curl portion 13) connecting between one end portion of the first base portion 11 and one end portion of the second base portion 11, and a second connecting portion (arm portion 12, curl portion 13) extending from the other end portion of the second base portion 11, by connecting the other end portion of the first base portion 11 of one of each of two sets of adjacent coil element structures in the plurality of sets of coil element structures to the other end portion of the first base portion 11 of the other coil element structure via the second connecting portion, the plurality of sets of coil element structures is annularly configured, the plurality of coil elements 10A to 10D are arranged to overlap each other in a radial direction of the coil 1 in each of the first base portion 11 and the second base portion 11, and each of at least one of the plurality of coil elements 10A to 10D is configured of a plurality of conducting wires 10a to 10d, which are arranged to be aligned along the circumferential direction of the coil 1 in each of the first base portion 11 and the second base portion 11.

According to the coil for the rotary electric machine of the first invention, the coil is annularly formed by the plurality of coil members and is inserted into the slot of the annular stator of the rotary electric machine. In this case, each of the plurality of coil members is configured of a plurality of coil elements, and the plurality of coil elements are inserted into the slots, and integrally include the plurality of sets of coil element structures, each set of coil element structures including the first base portion and the second base portion extending in the axial direction of the coil and spaced in the circumferential direction of the coil, a first connecting portion for connecting between one end portion of the first base portion and one end portion of the second base portion, and a second connecting portion extending from the other end portion of the second base portion. Further, by connecting the other end portion of the first base portion of one of each of the two sets of adjacent coil element structures in the plurality of sets of coil element structures to the other end portion of the first base portion of the other coil element structure via the second connecting portion, the plurality of sets of coil element structures is annularly configured. In addition, the plurality of coil elements is arranged to overlap each other in the radial direction of the coil in each of the first base portion and the second base portion, and each of at least one of the plurality of coil elements is configured of the plurality of conducting wires, which are arranged to be aligned along the circumferential direction of the coil in each of the first base portion and the second base portion. Therefore, as compared with a configuration in which many single conducting wires are stacked in the radial direction as disclosed in International Publication No. WO 2015/186838, when the annular coil mounted on the stator, it is possible to reduce the pressing force at the time of diameter reduction and diameter expansion. Thus, when the coil is mounted on the stator, burden on the coil can be reduced, and size and cost of a processing apparatus can be reduced, and manufacturing cost can be reduced.

In addition, as for the coil for the rotary electric machine according to the second aspect of the invention, in the coil for the rotary electric machine according to the first aspect of the invention, it is preferable that each of the first connecting portion and the second connecting portion includes two arm portions 12 extending to approach each other, while bending from the first base portion 11 and the second base portion 11 to the circumferential direction side of the coil 1, and a curl portion 13 twisting from one of the two arm portions 12, and making one rotation to continue to the other of the two arm portions 12, and that one of the two arm portions 12 is provided in a state displaced by the length in the radial direction of the arm portion 12 in the radial direction of the coil 1 with respect to the other arm portion 12.

According to the coil for the rotary electric machine of the second aspect of the invention, each of the first connecting portion and the second connecting portion includes two arm portions extending to approach each other, while bending from the first base portion and the second base portion to the circumferential direction side of the coil, and a curl portion making one rotation to continue to the other of the two arm portions while twisting from one of the two arm portions. Thereby, it is possible to integrate a plurality of coil elements without using a tying tool or the like, and the manufacturing cost can be reduced by that amount. Further, since one of the two arm portions is provided in a state displaced by the length in the radial direction of the arm portion in the radial direction of the coil with respect to the other arm portion, it is possible to reduce the dimension of two arm portions and the curl portions protruding outward from the slots, and the coil end height can be reduced. In addition to this, since the curl portion makes one rotation while twisting from one of the two arm portions to continue to the other of the two arm portions, as described above, when the annular coil is mounted on the stator, at the time of diameter reduction, the curl portion can be reduced in diameter while being elastically deformed like a torsion coil spring, and at the time of diameter expansion, it can be expanded while utilizing restoring force. As a result, pressing force at the time of diameter reduction and diameter expansion can be further reduced, and insulation quality can be improved.

As for the coil for the rotary electric machine according to the third aspect of the invention, in the coil for the rotary electric machine according to the first aspect of the invention, it is preferable that both ends of the plurality of coil elements 10A to 10D form wire connecting portions 14, in the wire connecting portion 14, in each of two coil elements overlapping each other in the radial direction of the coil among the plurality of coil elements 10A to 10D, one end portion of one of each of the two coil elements and one end portion of the other of each of the two coil elements are integrally wire connected, and among the plurality of coil elements, the other end portion of one coil element 10D arranged on the outermost side in the radial direction of the coil 1 is integrally wire connected, and the other end portions of one coil element 10A arranged on the innermost side in the radial direction of the coil 1 are integrally wire connected.

According to the coil for the rotary electric machine of the third aspect of the invention, both ends of the plurality of coil elements form the wire connecting portions, and in the wire connecting portion, in each of the two coil elements overlapping each other in the radial direction of the coil of the plurality of coil elements, one end portion of one of each of the two coil elements and one end portion of the other of each of the two coil elements are integrally wire connected. In addition, of the plurality of coil elements, the other end portion of one coil element arranged on the outermost side in the radial direction of the coil is integrally wire connected, and the other end portion of one coil element arranged on the innermost side in the radial direction of the coil is integrally wire connected. Thereby, it is possible to wind a plurality of conducting wires around the stator with the number of turns equal to the number of coil elements.

As for the coil for the rotary electric machine according to the fourth aspect of the invention, in the coil for the rotary electric machine according to the first aspect of the invention, it is preferable that each of the plurality of coil elements 10A to 10D is configured of a plurality of a same number of a plurality of conducting wires 10a to 10d as each other, the cross-sectional area of the plurality of conducting wires 10a to 10d are configured to become smaller as the conducting wires 10a to 10d are arranged radially inward of the coil 1, and the cross-sectional area is set according to a radial distance from an axial center of the coil 1 in each of the coil elements.

According to the coil for the rotary electric machine of the fourth aspect of the invention, each of the plurality of coil elements is configured of a plurality of the same number of the plurality of conducting wires as each other. In this case, since the circumferential length of the conducting wire arranged on the inner side in the radial direction of the coil is shorter than that of the conducting wire arranged on the outer side in the radial direction, when the plurality of conducting wires have the same cross-sectional area, resistance of the conducting wire arranged on the inner side in the radial direction of the coil becomes smaller than that arranged on the outer side in the radial direction. On the other hand, according to the coil for the rotary electric machine, the plurality of conducting wires are configured such that the cross-sectional area becomes smaller as the conducting wires are arranged radially inward of the coil, and that the cross-sectional area is set according to the radial distance from the axial center of the coil in each of the coil elements. Thereby, it is possible to equalize or substantially equalize the resistance between the conducting wire arranged on the inner side in the radial direction of the coil and the conducting wire arranged on the outer side in the radial direction of the coil. As a result, currents of the same or substantially the same magnitude can be flowed between the plurality of coil elements, and efficiency of the rotary electric machine can be improved.

As for the coil for the rotary electric machine according to the fifth aspect of the invention, in the coil for the rotary electric machine according to the first aspect of the invention, it is preferable that each of the plurality of coil elements 10A to 10D is configured of a same number of the plurality of rectangular conducting wires as each other, and the plurality of rectangular conducting wires are arranged in a state in which the short sides of the cross-section of each of the plurality of rectangular conducting wires overlap each other in the radial direction, in the first base portion and the second base portion 11, 11 and the first connecting portion and the second connecting portion (arm portion 12 and curl portion 13).

According to the coil for the rotary electric machine of the fifth aspect of the invention, each of the plurality of coil elements is configured of the same number of the plurality of rectangular conducting wires as each other, and the plurality of rectangular conducting wires are arranged in a state in which the short sides of the cross-section of each of the plurality of rectangular conducting wires overlap each other in the radial direction, in the first base portion and the second base portion and the first connecting portion and the second connecting portion. Thereby, it is possible to form the first base portion and the second base portion and the first connecting portion and the second connecting portion by flat-wise bending a plurality of rectangular conducting wires. As a result, at the time of coil fabrication, processing becomes easier, and peeling of the insulating coat from the conducting wire can be suppressed, so that insulation quality can be improved.

Further, in order to solve the above-mentioned problem, the sixth aspect of the invention includes, in a method of inserting a coil 1 for the rotary electric machine in which a coil 1 annularly formed by a plurality of coil members 10 is inserted into a slot 2a of an annular stator 2 of a rotary electric machine, configuring each of the plurality of coil members 10 by a plurality of coil elements 10A to 10D, configuring the plurality of coil elements 10A to 10D to integrally include a plurality of sets of coil element structures, each set of coil element structures including a first base portion 11 and a second base portion 11 extending in an axial direction of the coil 1 and spaced in the circumferential direction of the coil 1, a first connecting portion (arm portion 12, curl portion 13) connecting between one end portion of the first base portion 11 and one end portion of the second base portion 11, and a second connecting portion (arm portion 12, curl portion 13) extending from the other end portion of the second base portion 11, annularly configuring the plurality of sets of coil element structures by connecting the other end portion of the first base portion 11 of one of each of the two sets of adjacent coil element structures in the plurality of sets of coil element structures to the other end portion of the first base portion 11 of the other coil element structure via the second connecting portion, and arranging the plurality of coil elements 10A to 10D to overlap each other in a radial direction of the coil 1 in each of the first base portion 11 and the second base portion 11 and configuring each of at least one of the plurality of coil elements 10A to 10D by the plurality of conducting wires 10a to 10d, which are arranged to be aligned along the circumferential direction of the coil 1 in each of the first base portion 11 and the second base portion 11, in which the first base portion 11 and the second base portion 11 in the plurality of sets of coil element structures are inserted into slots 2a.

According to the method for inserting the coil for the rotary electric machine of the sixth aspect of the invention, the coil annularly formed by the plurality of coil members is inserted into the slot of the annular stator of the rotary electric machine. In that case, each of the plurality of coil members is configured of the plurality of coil elements, and the plurality of coil elements is configured to integrally include the plurality of sets of coil element structures each set of coil element structures including the first base portion and the second base portion extending in the axial direction of the coil and spaced in the circumferential direction of the coil, the first connecting portion connecting between one end portion of the first base portion and one end portion of the second base portion, and the second connecting portion extending from the other end portion of the second base portion. In addition, by connecting the other end portion of the first base portion of one of each of the two sets of adjacent coil element structures in the plurality of sets of coil element structures to the other end portion of the first base portion of the other coil element structure via the second connecting, the plurality of sets of coil element structures is annularly configured. Further, the plurality of coil elements is arranged to overlap each other in the radial direction of the coil in each of the first base portion and the second base portion, and each of at least one of the plurality of coil elements is configured of the plurality of conducting wires, which are arranged to be aligned along the circumferential direction of the coil in each of the first base portion and the second base portion. Then, since the first base portion and the second base portion of the plurality of sets of coil element structures are inserted into the slots, as compared with the case in which each of the plurality of coil elements is configured of one member or conducting wire is inserted into the slot, as disclosed in International Publication No. WO 2015/186838, when the annular coil is mounted on the stator, pressing force at the time of diameter reduction and diameter expansion can be reduced. As a result, the burden on the coil can be reduced, and the size and cost of the processing apparatus can be reduced, and the manufacturing cost can be reduced.

DETAILED DESCRIPTION OF THE PREFERRED EMBODIMENTS

Figure 1A:
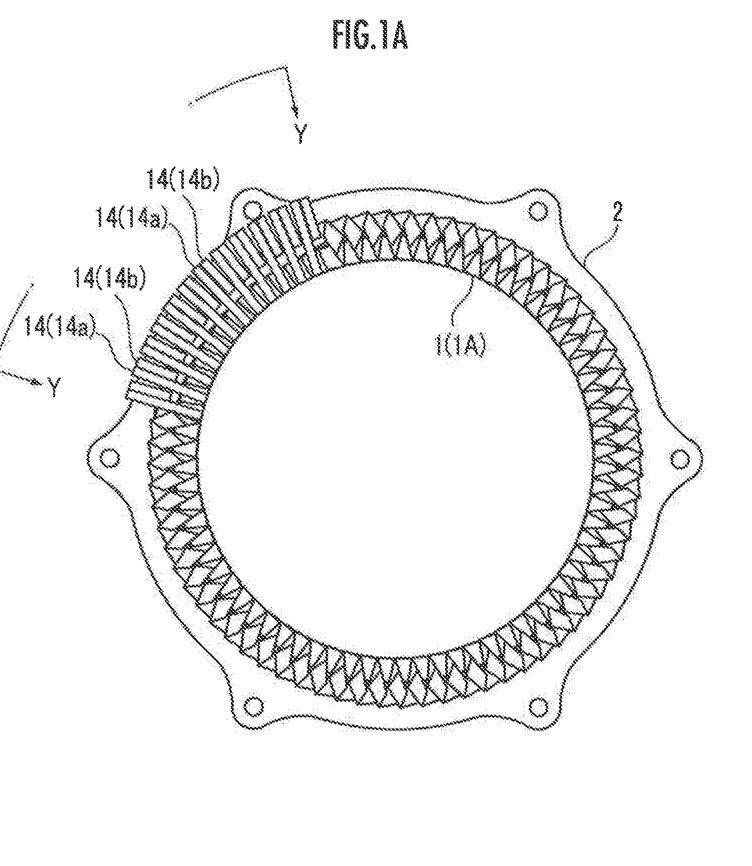
FIG. 1A is a front view illustrating a coil for a rotary electric machine and a stator to which the coil is mounted according to an embodiment of the present invention.

Hereinafter, a coil for a rotary electric machine according to an embodiment of the present invention will be described with reference to the drawings. As illustrated in FIG. 1, a coil 1 of the present embodiment is mounted on a stator 2 for the rotary electric machine.

Figure 2A:
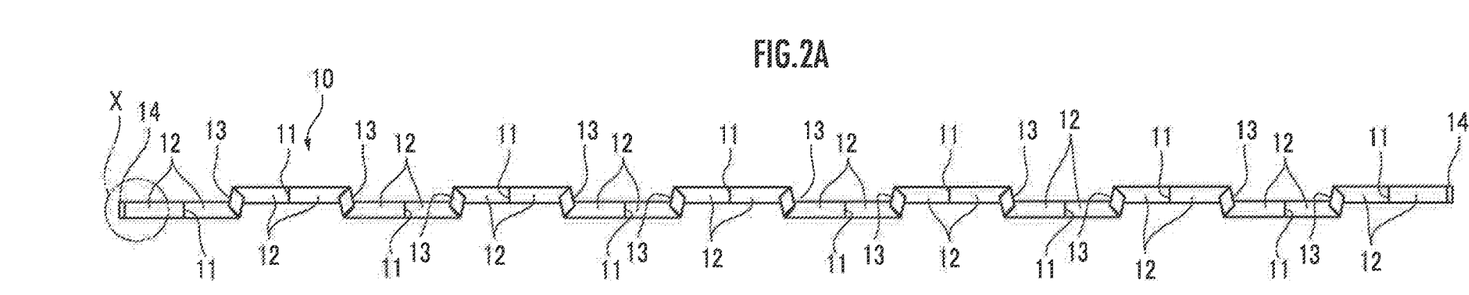
FIG. 2A is a front view of a coil member.
Figure 2B:
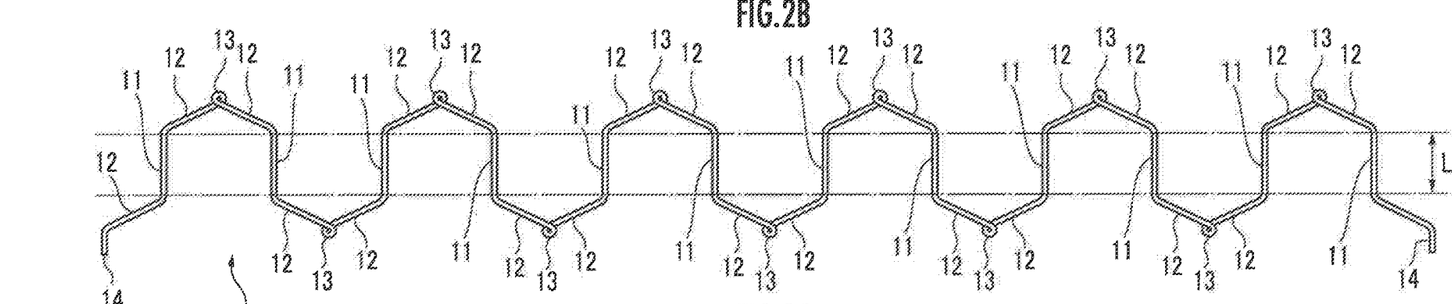
FIG. 2B is a plan view of the coil member.
Figure 3:
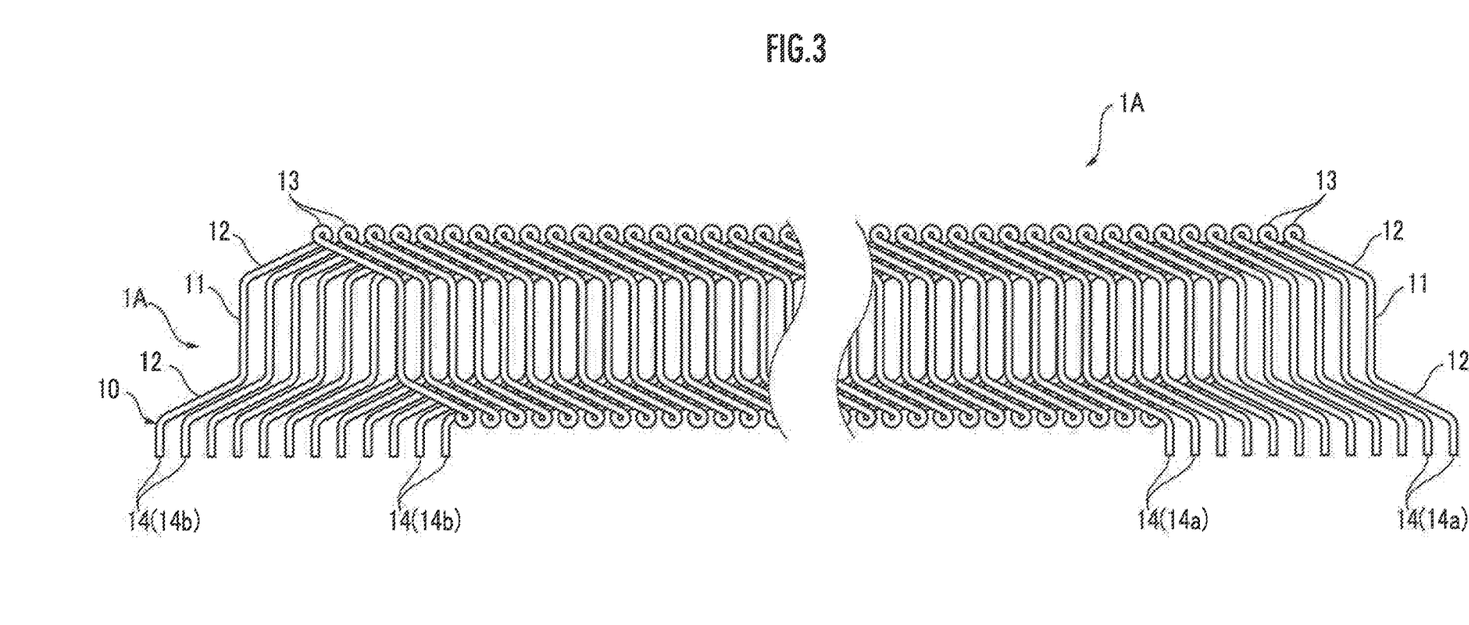
FIG. 3 is a plan view of a coil assembly before bending.
Figure 4:
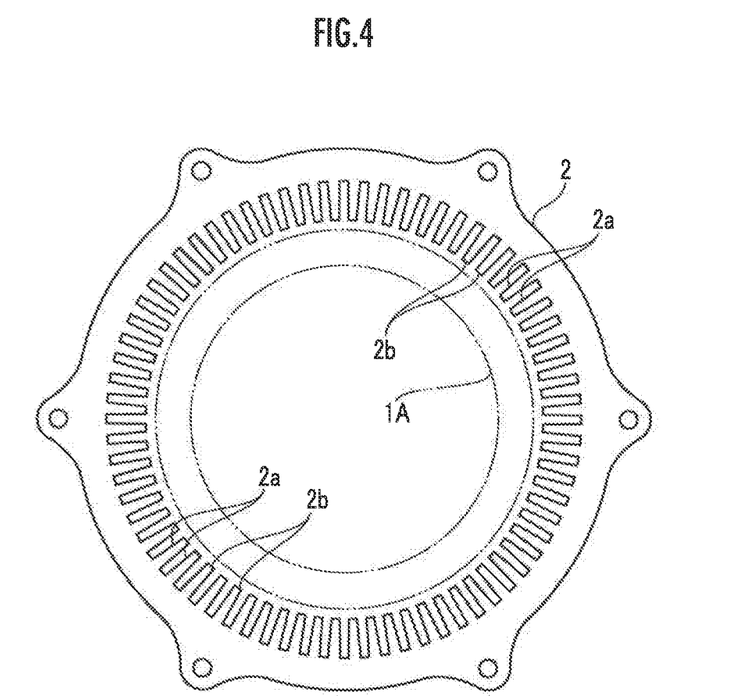
FIG. 4 is a front view illustrating a reduced diameter state for mounting the coil assembly on the stator.

In the case of the coil 1, a total of twelve coil members 10 illustrated in FIG. 2A and FIG. 2B are combined to manufacture a coil assembly 1A illustrated in FIG. 3. Then, after annularly (cylindrically) forming the coil assembly 1A, by inserting the coil assembly 1A into a slot 2a (see FIG. 4) of the stator 2 by a method to be described later, the coil assembly 1A is mounted on the stator 2 as illustrated in FIG. 1A.

Figure 2C:
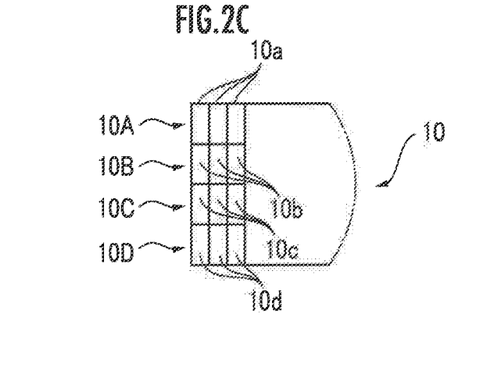
FIG. 2C is an enlarged view of a X portion of FIG. 2A.

First, a coil member 10 will be described. As illustrated in FIG. 2C, the coil member 10 is configured by integrally combining four coil elements 10A to 10D, and each of the four coil elements 10A to 10D is configured of three conducting wires.

Specifically, the coil element 10A is configured of three conducting wires 10a, and these three conducting wires 10a are set to have the same cross-sectional area as each other and are aligned side by side with their long sides in contact with each other. In addition, the coil element 10B is configured of three conducting wires 10b, and these three conducting wires 10b are also set to have the same cross-sectional area as each other and are aligned side by side with their long sides in contact with each other.

Further, the coil element 10C is configured of three conducting wires 10c, and these three conducting wires 10c are also set to have the same cross-sectional area as each other and are aligned side by side with their long sides in contact with each other. In addition, the coil element 10D is configured of three conducting wires 10d, and these three conducting wires 10d are also set to have the same cross-sectional area as each other and are aligned side by side with their long sides in contact with each other.

Each of above-mentioned twelve conducting wires 10a to 10d is of a rectangular conducting wire type and is configured by coating a surface of a highly conductive metal (for example, an aluminum alloy) with an insulating material. In FIG. 2A to FIG. 2C, to facilitate understanding, lines for indicating each of the conducting wires 10a to 10d are omitted as appropriate.

In addition, the four coil elements 10A to 10D are configured such that when the coil assembly 1A is inserted into the slot 2a, the cross-sectional area of the conducting wire 10a of the coil element 10A positioned on the most inner diameter side is the smallest, and that the cross-sectional area is larger as it is closer to the outer diameter side. That is, the cross-sectional area of the conducting wire 10d of the coil element 10D positioned on the outermost diameter side is set to be the largest. The reason for this will be described later.

As illustrated in FIG. 2A and FIG. 2B, the coil member 10 includes a base portion 11, an arm portion 12, a curl portion 13, and a wire connecting portion 14. These elements 11 to 14 are integrally formed by flat-wise bending the four coil elements 10A to 10D. That is, in the four coil elements 10A to 10D, the above-mentioned elements 11 to 14 are integrally formed by bending in a direction in which the long sides of three conducting wires are in contact with each other. In the following description of each configuration, a radial direction and a circumferential direction of the coil 1 are appropriately referred to as "radial direction" and "circumferential direction".

Each base portion 11 extends along the axial direction of the coil 1, and is inserted into the slot 2a of the stator 2 when the coil assembly 1A is mounted on the stator 2. A length between both end portions of the base portion 11 is slightly longer than the size in the axial direction of the slot 2a. The base portion 11, in which the length between both end portions thereof is somewhat longer than the size in the axial direction of the slot 2a, when inserted into the slot 2a, fits into the slot 2a at the portion of the length L illustrated in FIG. 2B.

Further, a pair of arm portions 12, 12 extend to the curl portion 13 to approach each other, while bending to a circumferential direction side of the coil 1 from a pair of base portions 11, 11, and the curl portion 13 makes one rotation while twisting from one end of one arm portion 12 to continue to one end of the other arm portion 12. In this case, the pair of arm portions 12, 12 may extend to the curl portion 13 to approach each other while bending to the circumferential direction side of the coil 1 from the pair of base portions 11, 11.

By configuration of the curl portion 13, the pair of arm portions 12, 12 on both sides of the curl portion 13 are configured to be displaced from each other in the radial direction by a radial size of the arm portion 12, that is, a radial thickness of four conducting wires 10a to 10d. Accordingly, the pair of base portions 11, 11 are also configured to be displaced from each other in the radial direction by the radial thickness of the four conducting wires 10a to 10d.

Further, the two adjacent curl portions 13, 13 are twisted while making one rotation in opposite directions to each other with respect to the radial direction of the coil 1, thereby, as for the base portion 11, those located on the inner side in the radial direction, and those located on the outer side in the radial direction and shifted from those by the radial thickness of the four conducting wires 10a to 10d, are alternately arranged in the circumferential direction.

In the present embodiment, a pair of adjacent base portions 11, 11 correspond to the first base portion and the second base portion, and a pair of arms 12, 12 and the curl portion 13 provided between the pair of base portions 11, 11 correspond to a first connecting portion and a second connecting portion. Further, the coil 1 integrally includes five sets of coil element structures, each set of coil element structures including the first base portion and the second base portion, the first connecting portion and the second connecting portion.

On the other hand, both end portions of the coil member 10 form two wire connecting portions 14, 14 respectively continuous to the two arm portions 12, 12, and in these wire connecting portions 14, 14, the twelve conducting wires 10a to 10d are wire connected as described later.

In addition, in the case of the present embodiment, as illustrated in FIG. 3, the coil assembly 1A is assembled by combining a total of the twelve coil members 10 such that the base portion 11, the arm portion 12, the curl portion 13, and the wire connecting portion 14 are aligned at predetermined intervals in the lateral direction in FIG. 3. In a state in which the coil assembly 1A is assembled in this manner, the wire connecting portions 14 on the left end side of each coil member 10 are arranged adjacent to the left end side of the coil assembly 1A at the predetermined interval, and the wire connecting portions 14 on the right end side of each coil member 10 are arranged adjacent to the right end side of the coil assembly 1A at the predetermined interval (see FIG. 3).

Further, after combining the coil member 10 as described above, the coil assembly 1A is annularly formed by a jig, which is not illustrated. At that time, the wire connecting portions 14 at both end portions of each coil member 10 are adjacent to each other at the predetermined intervals within a predetermined range in the circumferential direction, although not illustrated. Then, when the coil assembly 1A is mounted on the stator 2, first, the coil assembly 1A is reduced in diameter by a jig, which is not illustrated, to a state in which its outer diameter is smaller than the inner diameter of the stator 2 as indicated by a two-dot chain line in FIG. 4, lastly enlarged in diameter with a processing apparatus.

As a result, the base portion 11 of each coil member 10 of the coil assembly 1A is inserted into the slot 2a of the stator 2, whereby the coil assembly 1A is mounted on the stator 2. In this way, when the coil assembly 1A is mounted on the stator 2, the wire connecting portion 14a on the tight side in FIG. 3 is positioned on the inner diameter side of the stator 2, and the wire connecting portion 14b on the left side in FIG. 3 is positioned on the outer diameter side of the stator 2 (See FIG. 1A). In the following description, the wire connecting portion 14a positioned on the inner diameter side of the stator 2 is referred to as the "inner diameter side wire connecting portion 14a", and the wire connecting portion 14b positioned on the outer diameter side of the stator 2 is referred to as the "outer diameter side wire connecting portion 14b".

Figure 1B:
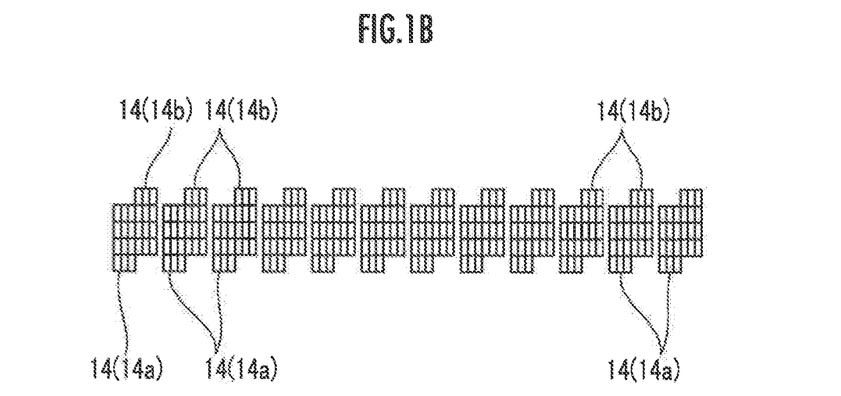
FIG. 1B is a plane developed view of a part of a Y-Y arrow view of FIG. 1A.

Then, from the state in which the coil assembly 1A is mounted on the stator 2, by a jig which is not illustrated, both the inner diameter side wire connecting portion 14a and the outer diameter side wire connecting portion 14b of each coil member 10 are bent to the outer diameter side and formed as illustrated in FIG. 1A and FIG. 1B. By this forming, as illustrated in FIG. 1B, the inner diameter side wire connecting portion 14a and the outer diameter side wire connecting portion 14b of one coil member 10 are configured such that one of them is displaced in the radial direction by a length in the radial direction with respect to the other, and that one is displaced in the circumferential direction by a thickness in the circumferential direction with respect to the other. In addition to this, the inner diameter side wire connecting portion 14a and the outer diameter side wire connecting portion 14b between the adjacent coil members 10 are configured to be aligned at equal intervals in the circumferential direction.

Figure 5:
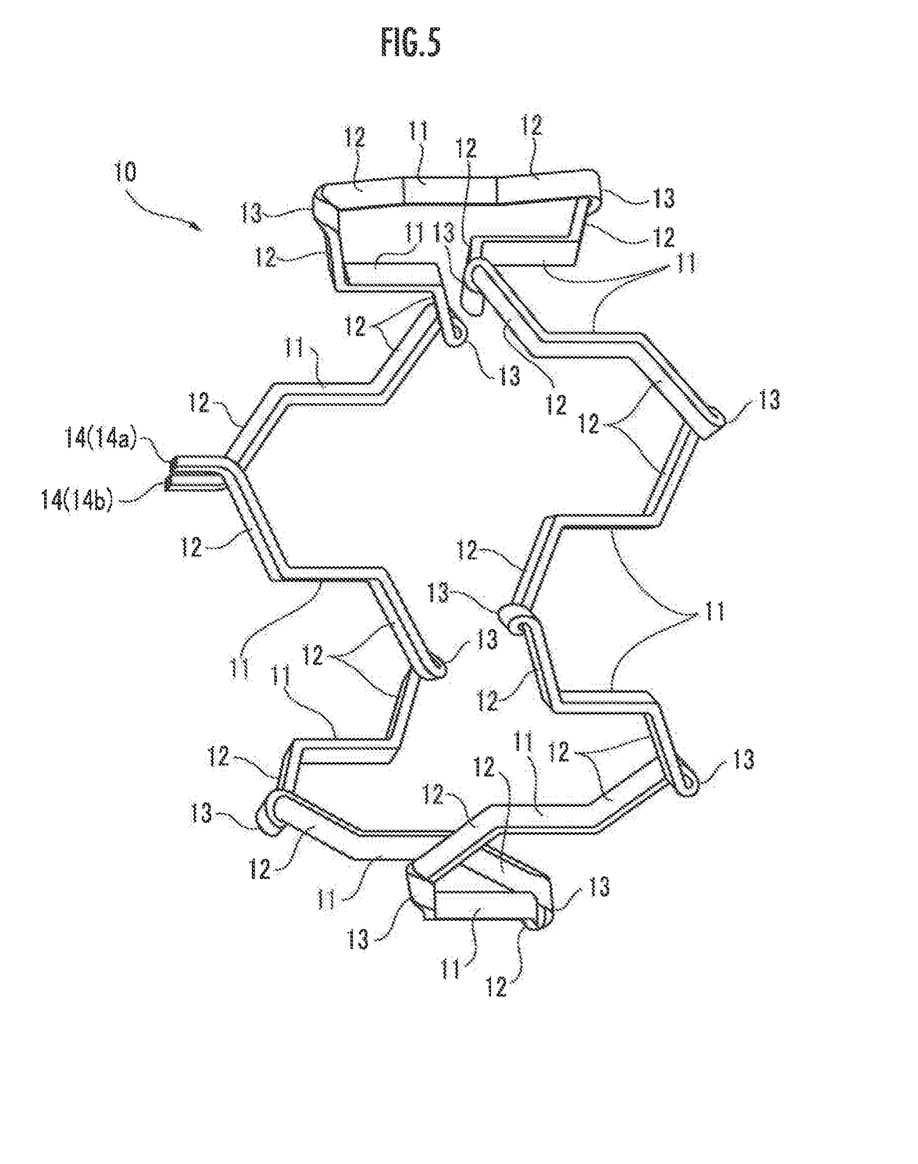
FIG. 5 is a perspective view illustrating one coil member when the coil assembly is mounted on the stator.
Figure 6:
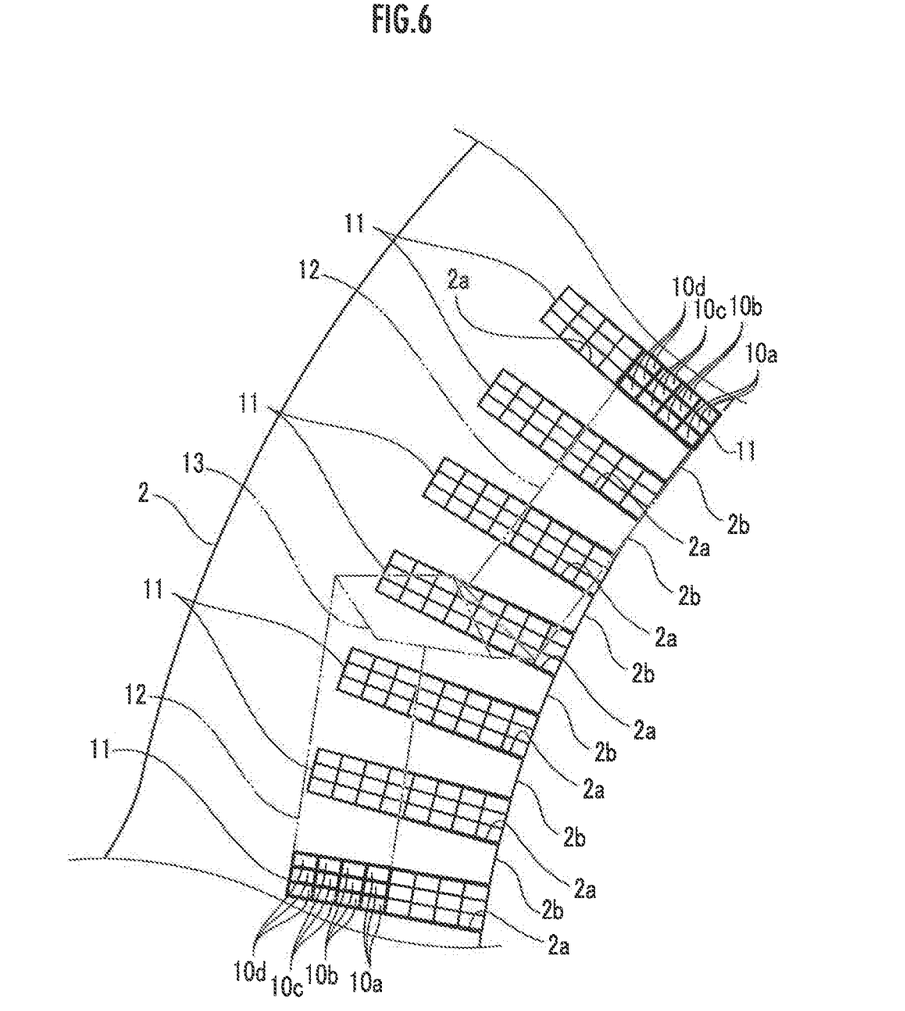
FIG. 6 is a cross-sectional view illustrating a part of the coil member and a slot when the coil assembly is mounted on the stator.

A predetermined number (72 the present embodiment) of slots 2a are aligned along the circumferential direction on an inner periphery of the stator 2, and each slot 2a is formed between two adjacent core teeth 2b, 2b. In a state in which the coil assembly 1A is mounted on the stator 2, one coil member 10 is annularly formed as illustrated in FIG. 5, and as illustrated in FIG. 6, two adjacent base portions 11, 11 (indicated by bold lines) of one coil member 10 are inserted respectively into two slots 2a, 2a arranged with five slots 2a therebetween. That is, in one coil member 10, the base portion 11 is inserted into the slots 2a aligned every fifth. In FIG. 6, to facilitate understanding, hatching illustrating the cross-section of the stator 2 and the base portion 11 is omitted.

In addition, in the two adjacent base portions 11, 11, as described above, due to the relationship that they are configured to be displaced from each other in the radial direction by the radial thickness of the four conducting wires 10a to 10d, gaps exist on one base portion 11 on the inner diameter side and the other base portion 11 on the outer diameter side, respectively, and the base portion 11 of another coil member 10 is arranged in these gaps (see FIG. 6).

Figure 7:
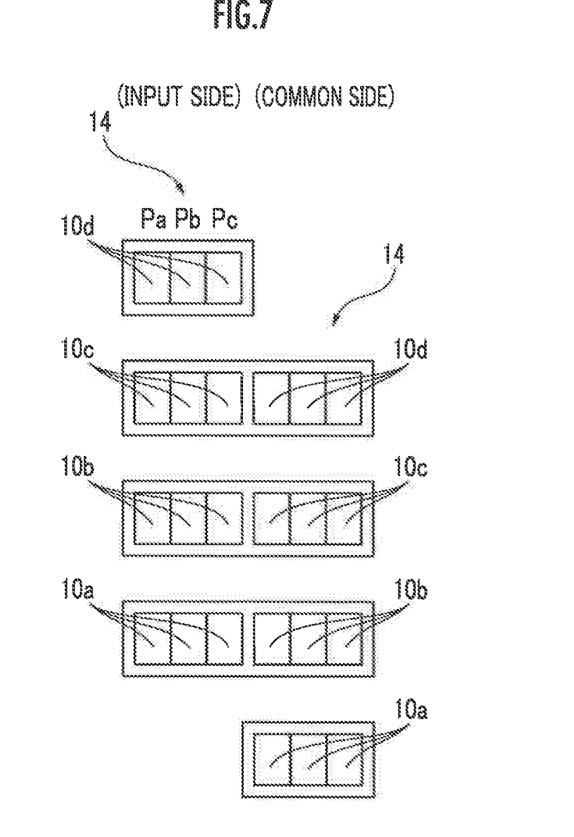
FIG. 7 is a diagram schematically illustrating an example of a wire connection state of a conducting wire of the coil member.

Next, a wire connection method of the coil 1 will be described. In the coil 1, after the coil assembly 1A is mounted on the stator 2, the connecting portions 14, 14 at both ends of one coil member 10 are wire connected as illustrated in FIG. 7. First, when the wire connecting portion 14 on the left side of the figure is an input side and the wire connecting portion 14 on the right side of the figure is a common side, the three conducting wires 10d at the wire connecting portion 14 on the input side are integrally wire connected, and the three conducting wires 10c at the wire connecting portion 14 on the input side and the three conducting wires 10d at the wire connecting portion 14 on the common side are integrally wire connected.

Further, the three conducting wires 10b at the wire connecting portion 14 on the input side and the three conducting wires 10c at the wire connecting portion 14 on the common side are integrally wire connected, the three conducting wires 10a at the wire connecting portion 14 on the input side and the three conducting wires 10b at the wire connecting portion 14 on the common side are integrally wire connected and the three conducting wires 10a at the wire connecting portion 14 on the common side are integrally wire connected.

Figure 8:
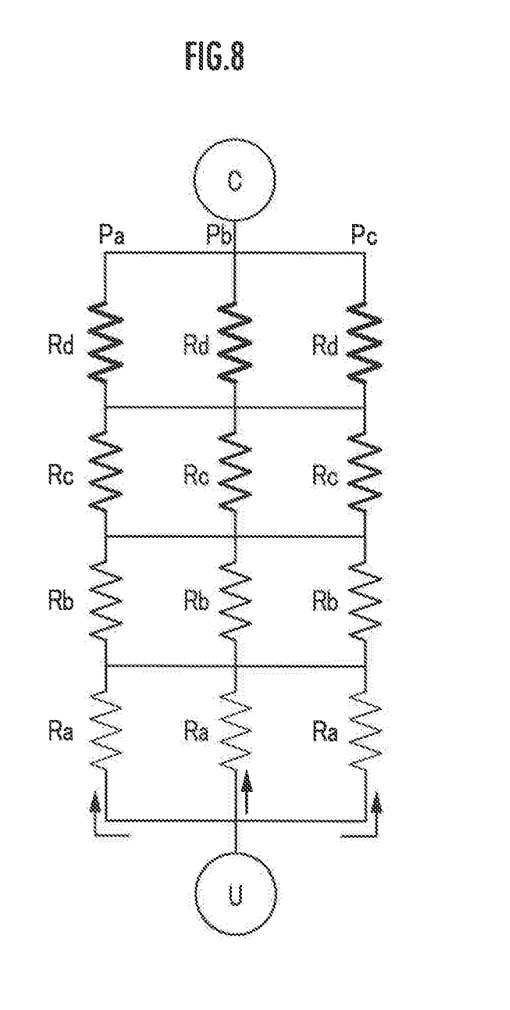
FIG. 8 is a diagram illustrating an equivalent circuit of a configuration of FIG. 7.

In the case of the wire connection as described above, in one coil member 10, three conducting wires 10a extending between the input side and the common side are set as one turn, so that the conducting wires 10a to 10d for a total of four turns are wound around the stator 2. When this configuration is expressed by an equivalent circuit, it is as illustrated in FIG. 8.

In the figure, Ra to Rd indicate resistance of the conducting wires 10a to 10d, respectively, and Pa to Pc indicate a path through which the current flows. Here, for example, in the case of using the conducting wires 10a to 10d having the same cross-sectional area as each other, due to the relationship that the closer to the inner diameter side, the shorter the length between both ends, thus lowering the resistance, Ra≤Rb≤Rc≤Rd is satisfied. As a result, although the same current flows through the three paths Pa to Pc when current is applied, copper loss occurs because the amount of heat generation becomes larger, in the order of the conducting wires that are arranged toward the inner diameter side.

In the case of the coil 1 of the present embodiment, in order to avoid the occurrence of this problem, to satisfy Ra=Rb=Rc=Rd or Ra≅Rb≅Rc≅Rd, it is configured such that, as described above, the cross-sectional area of the conducting wire 10a arranged on the most inner diameter side is the smallest, and that the cross-sectional area of the conducting wire arranged on the more outer diameter side is larger, and the cross-sectional area of each conducting wire is set according to a radial distance from the axial center of the coil 1 in the conducting wire of each coil element. This is because a length between both ends of the conducting wire is determined according to a length of the conducting wire in the radial distance from the axial center of the coil 1.

As described above, according to the coil 1 of the present embodiment, the coil assembly 1A is annularly formed by combining the twelve coil members 10, and the coil assembly 1A is reduced in diameter until its outer diameter is smaller than the inner diameter of the stator 2, then, inserted into the slot 2a of the stator 2 by being expanded in diameter. In that case, since each of the four coil elements 10A to 10D in the base portion 11 is configured of three conducting wires aligned along the circumferential direction of the coil 1, it is possible to reduce the pressing force necessary at the time of diameter reduction and diameter expansion, as compared with the case of International Publication No. WO 2015/186838 in which one rectangular conducting wire is stacked in a large number in the radial direction.

For example, when the number of coil elements stacked in the radial direction in one slot 2a is set to be the same for the coil 1 of the present embodiment and the coil of International Publication No. WO 2015/186838, in the coil 1 of the present embodiment, by configuring each coil element by three conducting wires, it is possible to reduce the pressing force necessary at the time of diameter reduction and diameter expansion to (1/3)×(1/3)×(1/3)×3=1/9, as compared with the coil of international Publication No. WO 2015/186838. As described above, when the coil 1 is mounted on the stator 2, burden on the coil 1 can be reduced, and size and cost of the processing apparatus can be reduced, and manufacturing cost can be reduced.

Further, since, in the coil member 10, the rectangular conducting wires 10a to 10d are arranged in a state in which the short sides of the cross-section of each rectangular conducting wire overlap each other in the radial direction in the base portion 11, the arm portion 12 and the curl portion 13, by flat-wise bending the twelve conducting wires 10a to 10d, the base portion 11, the arm portion 12, the curl portion 13 and the wire connecting portion 14 can be integrally formed. Thereby, at the time of manufacturing the coil, it is possible to integrate the twelve conducting wires 10a to 10d without using a tying tool or the like, and the manufacturing cost can be reduced by that much. For the same reason, it is possible to suppress peeling of the insulating coat from the conducting wires 10a to 10d during coil fabrication, and the manufacturing cost can be further reduced.

In addition to this, due to the above-mentioned configuration of the pair of arm portions 12, 12 and the curl portion 13, the pair of arm portions 12, 12 on both sides of the curl portion 13 are configured to be displaced from each other in the radial direction by the radial size of the arm portion 12, that is, the radial thickness of the four conducting wires 10a to 10d, so that it is possible to reduce the dimension of the arms 12 and the curl portions 13 protruding outward from the slots 2a, and the coil end height can be reduced.

In addition, in the equivalent circuit of FIG. 8 when wire connected as illustrated in FIG. 7, to satisfy Ra=Rb=Rc=Rd or Ra≅Rb≅Rc≅Rd, the conducting wires 10a to 10d are configured such that the cross-sectional area of the conducting wire 10a arranged on the most inner diameter side is the smallest, and that the cross-sectional area of the conducting wire arranged on the more outer diameter side is larger. Thereby, resistance of the conducting wires 10a to 10d can be equalized, and occurrence of copper loss can be suppressed, so that efficiency of the rotary electric machine can be improved.

Further, according to the method of inserting the coil 1 of the present embodiment, the above-mentioned working effect can be obtained.

Figure 9:
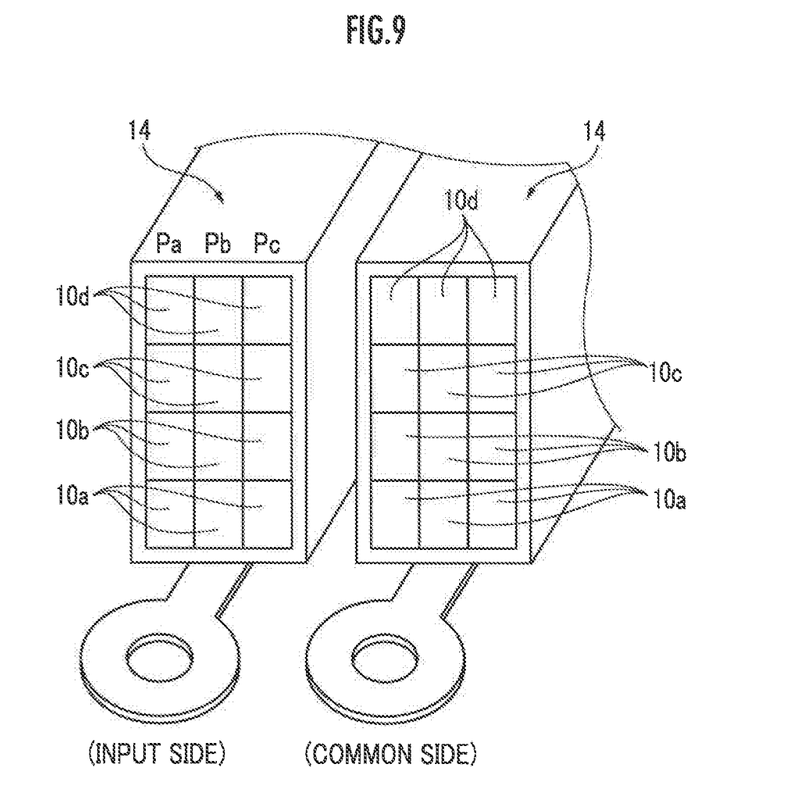
FIG. 9 is a diagram schematically illustrating a modified example of the wire connection state of the conducting wire of the coil member.

The embodiment is an example in which the wire connecting portions 14, 14 at both ends of the coil member 10 are wire connected as illustrated in FIG. 7, but instead of this, they may be wire connected as illustrated in FIG. 9. In the wire connection example illustrated in the figure, the twelve conducting wires 10a to 10d on the input side are integrally wire connected, and the twelve conducting wires 10a to 10d on the common side are integrally wire connected.

Figure 10:
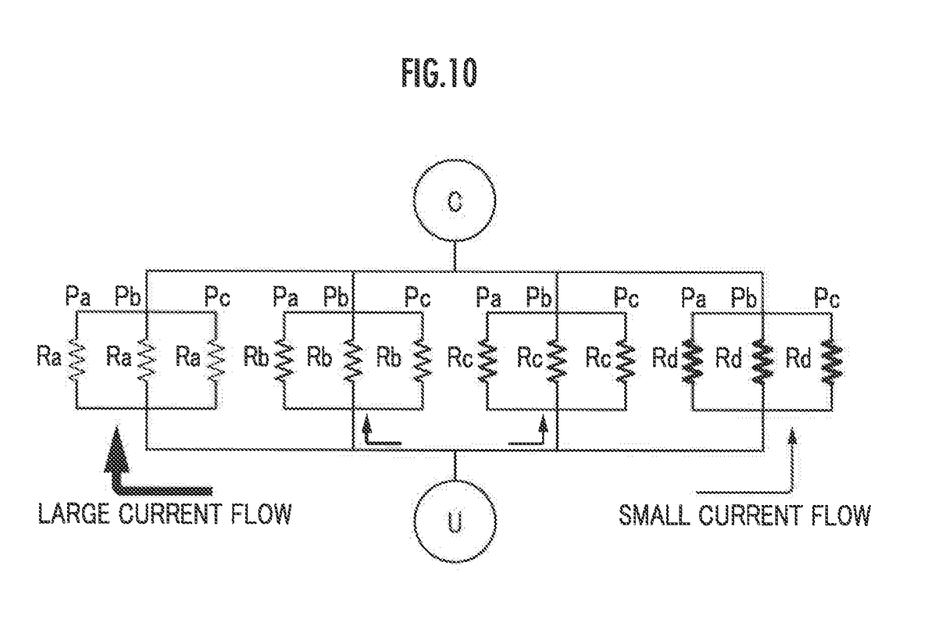
FIG. 10 is a diagram illustrating an equivalent circuit of a configuration of FIG. 9.

When wire connected in this way, its equivalent circuit is as illustrated in FIG. 10. In the figure, when the cross-sectional areas of the twelve conducting wires 10a to 10d are the same, as described above, due to the relationship that Ra≤Rb≤Rc≤Rd is satisfied, resistance of the path passing through the three outermost conducting wires 3a becomes the largest, while resistance decreases as the path passes through the more inner conducting wire. As a result, only small current flows in the path passing through the three conducting wires 3d, and large current flows in the path passing through the three conducting wires 3a.

On the contrary, in the case of the twelve conducting wires 10a to 10d of the present embodiment, as described above, it is configured such that the cross-sectional area of the conducting wire 10a arranged on the inner most radial side is the smallest, and that the cross-sectional area of the conducting wire arranged on the more outer diameter side is larger, and the cross-sectional area of each conducting wire is set according to the radial distance from the axial center of the coil 1 in the conducting wire of each coil element, so that it becomes possible to equalize the resistance of the four paths to the same value. As a result, even when it is wire connected as illustrated in FIG. 9, it is possible to equalize the resistance of the conducting wires 10a to 10d, and to improve the efficiency of the rotary electric machine by suppressing occurrence of copper loss due to heat generation of specific conducting wires.

Further, the embodiment is an example in which the twelve coil members 10 are used as the plurality of coil members, but the number of the plurality of coil members of the present invention is not limited to this, and may be set as appropriate according to the number of poles and the number of phases of a rotary electric machine or the like. For example, 6×n (n is an integer) pieces of coil members may be used as the plurality of coil members.

Further, the embodiment is an example in which coil element structures equivalent to six sets are used as the plurality of sets of coil element structures, but the number of sets of coil element structures of the present invention is not limited to this, and only has to be the plurality of sets. For example, a coil element structure of five sets or less or seven sets or more may be used.

On the other hand, in the embodiment, the four coil elements 10A to 10D are used as the plurality of coil elements, but instead of this, two to three or five or more coil elements are used as a plurality of coil elements may be used. Further, the coil member 10 of the embodiment divided into a coil member configured of two coil elements 10A and 10B, and a coil member configured of the two coil elements 10C and 10D may be used as a coil member. In such a configuration, the base portions of the four coil members are inserted into one slot 2a.

In addition, the embodiment is the example in which each of the four coil elements 101 to 10D is configured of three conducting wires, but the coil element of the present invention is not limited to this, and each of at least one of the plurality of coil elements only has to be configured of a plurality of conducting wires. For example, any one of the four coil elements 10A to 10D may be configured of three conducting wires (for example, the coil element 10A may be configured of three conducting wires 10a) and the other coil elements may be configured of one conducting wire. Further, each of the two coil elements 10A, 10D may be configured of three conducting wires, and each of the remaining two coil elements 10B, 10C may be configured of one or two conducting wires, or they may be configured in reverse relation. In addition, the plurality of coil elements may be configured of different numbers of conducting wires from each other.

Further, the embodiment is an example configured such that in the conducting wires 10a to 10d of the coil 1, the cross-sectional area of the conducting wire 10a arranged on the inner most radial side is the smallest, and that the cross-sectional area of the conducting wire arranged on the more outer diameter is larger, instead of these, as the conducting wires 10a to 10d, those having the same cross-sectional area as each other may be used.

On the other hand, the embodiment is an example in which, when the coil 1 is mounted on the stator 2, in one coil member 10, the base portion 11 is configured to be inserted into the slot 2a aligned every fifth, but the interval between the slots 2a into which the base portion 11 is inserted is not limited to this, and can be set appropriately according to the number of poles and the number of phases of the rotary electric machine or the like. For example, the base portion of the coil member may be configured to be inserted into the slot every 6×n−1 (n is an integer).

What is claimed is:
1. A coil for a rotary electric machine, annularly formed by a plurality of coil members, and inserted into a slot of an annular stator of the rotary electric machine,
   wherein each of the plurality of coil members is configured of a plurality of coil elements,
   the plurality of coil elements integrally comprises a plurality of sets of coil element structures, each set of coil element structures including a first base portion and a second base portion inserted into the slot, extending in an axial direction of the coil and spaced in a circumferential direction of the coil, a first connecting portion connecting between one end portion of the first base portion and one end portion of the second base portion, and a second connecting portion extending from the other end portion of the second base portion, the plurality of sets of coil element structures is annularly configured by connecting the other end portion of the first base portion of one of each of the two sets of adjacent coil element structures in the plurality of sets of coil element structures, to the other end portion of the first base portion of the other coil element structure via the second connecting portion, the plurality of coil elements are arranged to overlap each other in a radial direction of the coil in each of the first base portion and the second base portion, and each of at least one of the plurality of coil elements is configured of a plurality of conducting wires, the plurality of conducting wires are arranged to be aligned along the circumferential direction of the coil in each of the first base portion and the second base portion, each of the first connecting portion and the second connecting portion comprises two arm portions extending to approach each other, while bending from the first base portion and the second base portion to a circumferential direction side of the coil, and a curl portion twisting from one of the two arm portions and making one rotation to continue to the other of the two arm portions, and one of the two arm portions is provided in a state displaced by a length in a radial direction of the arm portion in the radial direction of the coil with respect to the other arm portion.

2. The coil for the rotary electric machine according to claim 1, wherein both ends of the plurality of coil elements are formed as wire connecting portions, and at the wire connecting portion, in each of the two coil elements overlapping each other in the radial direction of the coil among the plurality of coil elements, one end of one of the two coil elements and one end of the other of the two coil elements are integrally wire connected, and among the plurality of coil elements, the other end portions of one coil element arranged on an outermost side in the radial direction of the coil are integrally wire connected, and the other end portions of one coil element arranged on an innermost side in the radial direction of the coil are integrally wire connected.

3. The coil for the rotary electric machine according to claim 1, wherein each of the plurality of coil elements is configured of a same number of a plurality of rectangular conducting wires as each other, and the plurality of rectangular conducting wires are arranged in a state in which short sides of a cross-section of each of the plurality of rectangular conducting wires overlap each other in the radial direction, in the first base portion and the second base portion and the first connecting portion and the second connecting portion.

4. A method of inserting a coil for a rotary electric machine in which a coil annularly formed by a plurality of coil members is inserted into a slot of an annular stator of the rotary electric machine, comprising:

configuring each of the plurality of coil members by a plurality of coil elements;

configuring the plurality of coil elements to integrally comprise a plurality of sets of coil element structures, each set of coil element structures including a first base portion and a second base portion extending in an axial direction of the coil and spaced in a circumferential direction of the coil, a first connecting portion connecting between one end portion of the first base portion and one end portion of the second base portion, and a second connecting portion extending from the other end portion of the second base portion, each of the first connecting portion and the second connecting portion comprises two arm portions extending to approach each other, while bending from the first base portion and the second base portion to a circumferential direction side of the coil, and a curl portion twisting from one of the two arm portions and making one rotation to continue to the other of the two arm portions, and one of the two arm portions is provided in a state displaced by a length in a radial direction of the arm portion in the radial direction of the coil with respect to the other arm portion;

annularly configuring the plurality of sets of coil element structures by connecting the other end portion of the first base portion of one of each of the two sets of adjacent coil element structures in the plurality of sets of coil element structures, to the other end portion of the first base portion of the other coil element structure via the second connecting portion;

arranging the plurality of coil elements to overlap each other in a radial direction of the coil in each of the first base portion and the second base portion, and configuring each of at least one of the plurality of coil elements by a plurality of conducting wires;

arranging the plurality of conducting wires to be aligned along the circumferential direction of the coil in each of the first base portion and the second base portion; and inserting the first base portion and the second base portion in the plurality of sets of coil element structures into the slot.

* * * * *